United States Patent [19]

Lang

[11] Patent Number: 5,113,172

[45] Date of Patent: May 12, 1992

[54] ANGLE OF ROTATION POTENTIOMETER

[75] Inventor: Armin Lang, Schwäbisch Gmünd, Fed. Rep. of Germany

[73] Assignee: Zahnradfabrik Friedrichshafen, AG., Friedrichshafen, Fed. Rep. of Germany

[21] Appl. No.: 444,129

[22] PCT Filed: Jun. 30, 1988

[86] PCT No.: PCT/EP88/00579

§ 371 Date: Nov. 27, 1989

§ 102(e) Date: Nov. 27, 1989

[87] PCT Pub. No.: WO89/00331

PCT Pub. Date: Jan. 12, 1989

[30] Foreign Application Priority Data

Jul. 7, 1987 [DE] Fed. Rep. of Germany ....... 3722389

[51] Int. Cl.[5] .................. H01C 10/32; H01C 10/16; H01C 10/26

[52] U.S. Cl. .................. 338/171; 338/129; 338/130; 338/174

[58] Field of Search ............ 338/129, 130, 131, 132, 338/134, 135, 160, 162, 171, 174; 324/691, 714, 176, 154 R

[56] References Cited

U.S. PATENT DOCUMENTS

| 3,676,822 | 7/1972 | Slagg et al. | 338/132 |
|---|---|---|---|
| 3,748,626 | 7/1973 | Maurice | 338/162 |
| 4,511,879 | 4/1985 | Fujii | 338/174 |
| 4,521,761 | 6/1985 | Welch | 338/162 X |
| 4,523,175 | 6/1985 | Sakurai | 338/134 |

Primary Examiner—Marvin M. Lateef
Attorney, Agent, or Firm—Albert M. Zalkind

[57] ABSTRACT

A potentiometer for the redundant measurement of the angle of rotation of a shaft compared with a fixed member has two resistance paths located concentrically with each other on a fixed disk. Two collector paths having the shape of circular rings are located concentrically with each other on a disk situated parallel to the fixed disk and rotating together with the shaft. Two slide contacts connected with the collector paths are in contact with the two resistance paths. Two redundant measured values are tapped at two terminal contacts fastened to the fixed disk that are in contact with the collector paths through two slide contacts.

4 Claims, 3 Drawing Sheets

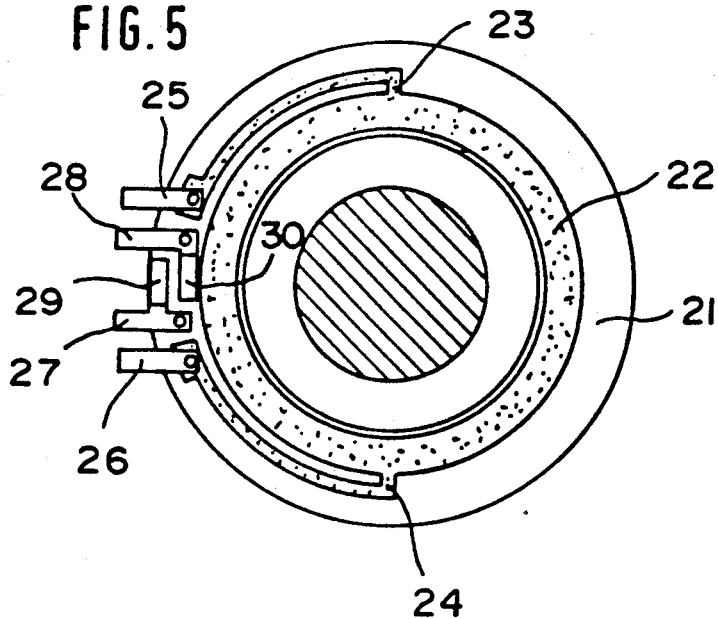
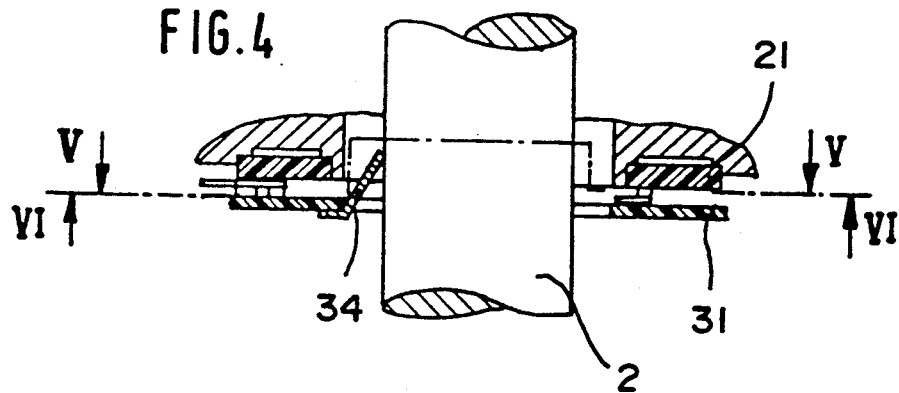
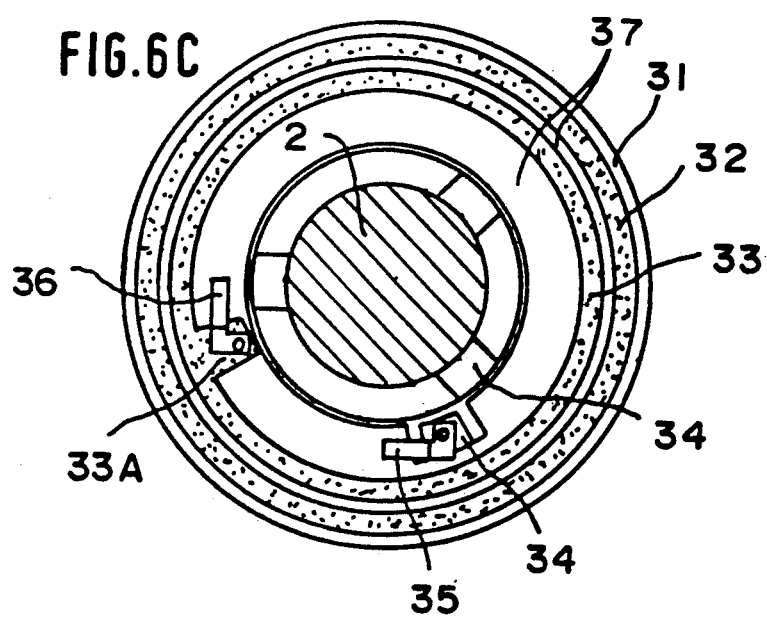

5,113,172

ANGLE OF ROTATION POTENTIOMETER

BACKGROUND OF THE INVENTION

The invention relates to a potentiometer for measuring the angle of rotation of a shaft compared with a fixed member.

BRIEF DESCRIPTION OF THE PRIOR ART

In a known potentiometer, a resistance path shaped like the arc of a circle is located on a fixed disk concentrically arranged with a collector path shaped like the arc of a circle. Two elastic slide contacts are held on the shaft with a hub. If such a potentiometer is to be equipped for a redundant angle of rotation display, a second collector path must be provided. This second collector path can be provided in the same radial area of the first collector path. As a result, the measuring range would be cut in half. On the other hand, if the second collector path is located radially outside of the resistance path that is already present and the collector path, large radial dimensions results. The situation is similar if a second collector path is desired to be able to carry out a seamless measurement of several shaft rotations. In this case, a second collector path would also have to be located radially outside of the paths that were already present. Furthermore, locating a second collector path and a second resistance path on another fixed disk parallel to the first disk is conceivable. All of these arrangements would result in an enlargement of the potentiometer in the radial or the axial direction.

SUMMARY OF THE INVENTION

The object of the invention is to provide a potentiometer for the indicated uses that has dimensions that are as small as possible in spite of the presence of two collector paths both in the axial and the radial direction.

By arranging two circular collector paths concentrically on a disk rotating with the shaft, either a redundant potentiometer with a measuring angle between 180° and 360° or a simple potentiometer for seamless measurement of several shaft rotations is provided that has very small radial dimensions. Since the rotating disk requires only a very small thickness, the axial measurement of the potentiometer is also no larger than that of a conventional potentiometer.

BRIEF DESCRIPTION OF THE DRAWING

Other objects and advantages of the invention will become apparent from a study of the following specification when viewed in the light of the accompanying drawing, in which:

FIG. 4 shows the potentiometer according to a second embodiment;

FIG. 5 shows a cross-section through the potentiometer, along the line V-V in FIG. 4.

DETAILED DESCRIPTION

Figure 2:
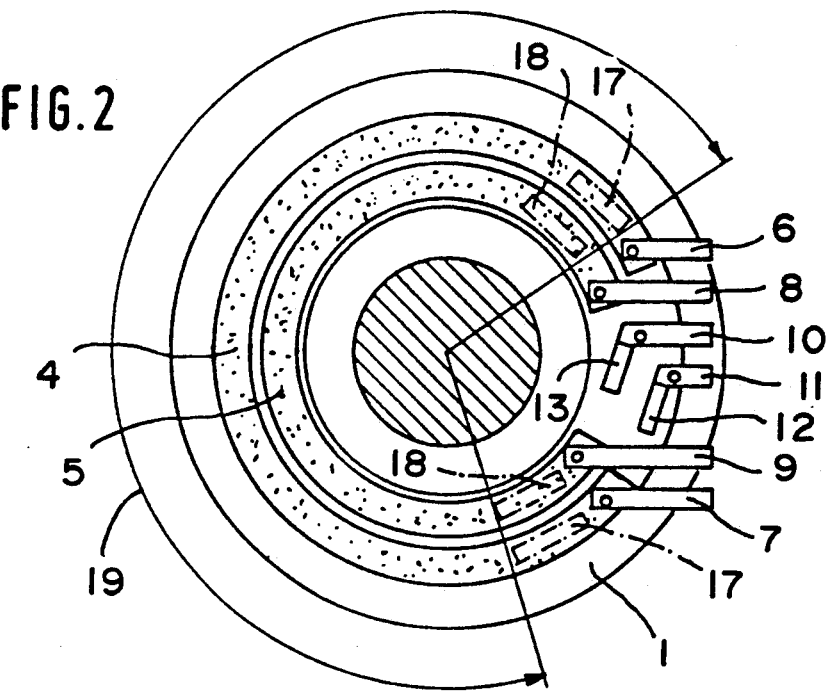
FIG. 2 shows a cross-section through the potentiometer along the line II-II in FIG. 1.
Figure 1:
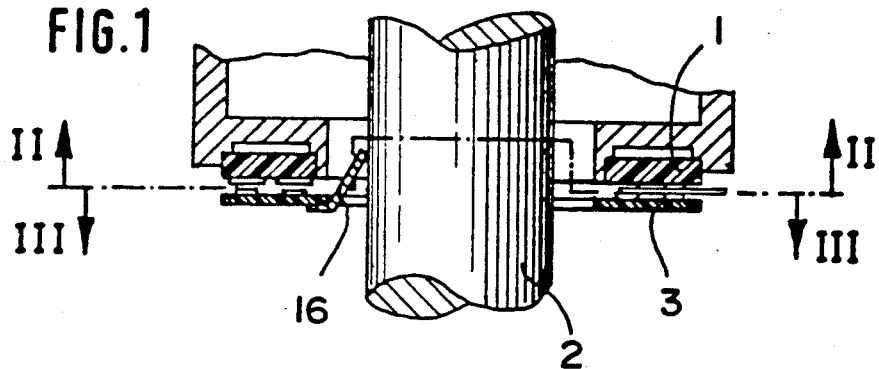
FIG. 1 shows the potentiometer according to a preferred embodiment.
Figure 3:
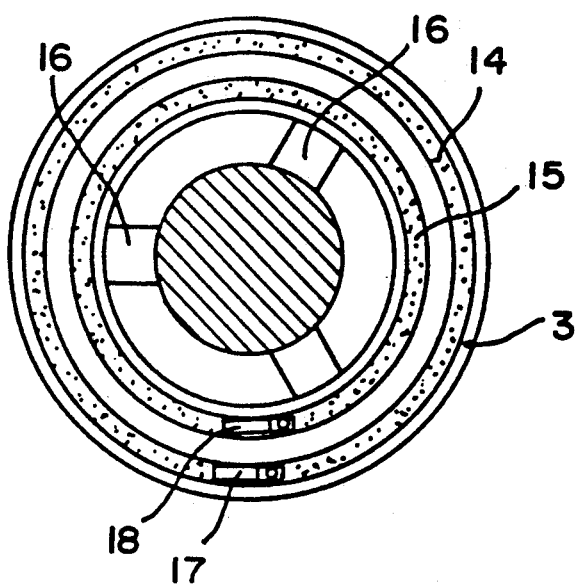
FIG. 3 shows a cross-section through the potentiometer long the line III-III in FIG. 1.

The basic elements of the potentiometer according to the invention include a fixed disk 1 and a disk 3 rotating together with a shaft 2. In the preferred embodiment (FIGS. 1-3) of the potentiometer, which serves the purpose of performing redundant measuring of the angle of rotation of the shaft 2, two resistance paths 4 and 5 shaped like arcs of circles are arranged on the fixed disk 1. Each of the two resistance paths has a terminal contact 6 and 7 or 8 and 9 at each of its ends. Furthermore, two more terminal contacts 10 and 11 that are connected with two slide contacts 12 and 13 are fastened to the fixed disk 1. The slide contacts 12 and 13 serve the purpose of tapping the current from two collector paths 14 and 15 that are mounted on the rotating disk 3 as concentric circular paths. The disk 3 rotating together with the shaft 2 is connected with the shaft 2 by three arms 16 riveted to the rotating disk 3, for example.

Two slide contacts 17 and 18 that are in flexible contact with the two resistance paths 4 and 5 are fastened to the rotating disk 3 in the area of the two collector paths 14 and 15.

The largest angle of rotation 19 of the shaft 2 measurable with this potentiometer is determined by the space required for the terminal contacts 6, 7, 8, 9, 10 and 11 and by the end positions of the slide contacts 17 and 18 in relation to the resistance paths 4 and 5 determined thereby. There the angle of rotation 19 amounts to more than 250°. The two end positions of the slide contacts 17 and 18 are indicated by dash-dot lines in FIG. 2.

The potentiometer according to the second embodiment represented in FIG. 4 serves the purpose of measuring several steering shaft rotations by two measuring signals staggered with respect to each other. A resistance path 22 shaped like a circular ring is mounted on the fixed disk 21. The resistance path 22 is connected with two terminal contacts 25 and 26 at two resistance-tapping points 23 and 24 that are offset with respect to each other by 180°.

Two terminal contacts 27 and 28 that are connected with two slide contacts 29 and 30 are fastened to the fixed disk 21. The slide contacts 29 and 30 are in contact with two collector paths 32 and 33 shaped like circular rings that are located concentrically with each other on the rotating disk 31. The rotating disk 31, like the rotating disk 3 of the first embodiment, is connected with the shaft 2 by arms 34, for example. Two slide contacts 35 and 36 offset with respect to each other by 90° are mounted on the rotating disk 31 and are connected with the collector paths 32 and 33 in flexible contact with the resistance path 22.

Figure 6B:
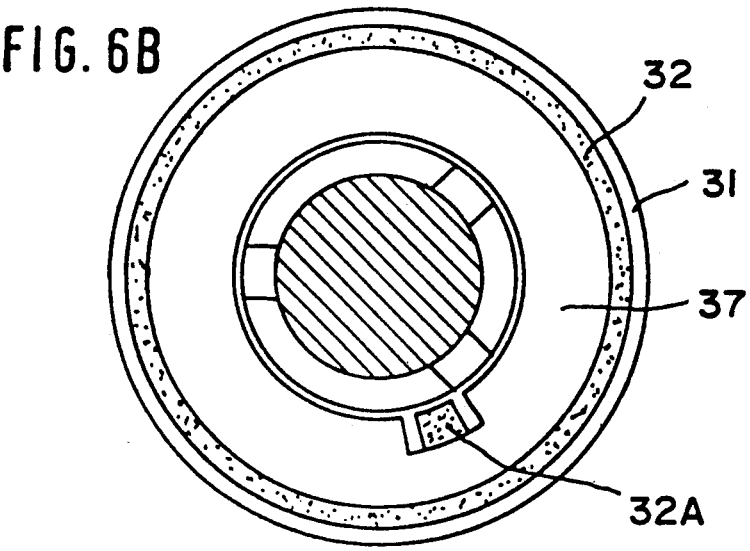
FIG. 6 shows cross-sections through the potentiometer along the line VI-VI in FIG. 4 in different stages of manufacture.
Figure 6A:
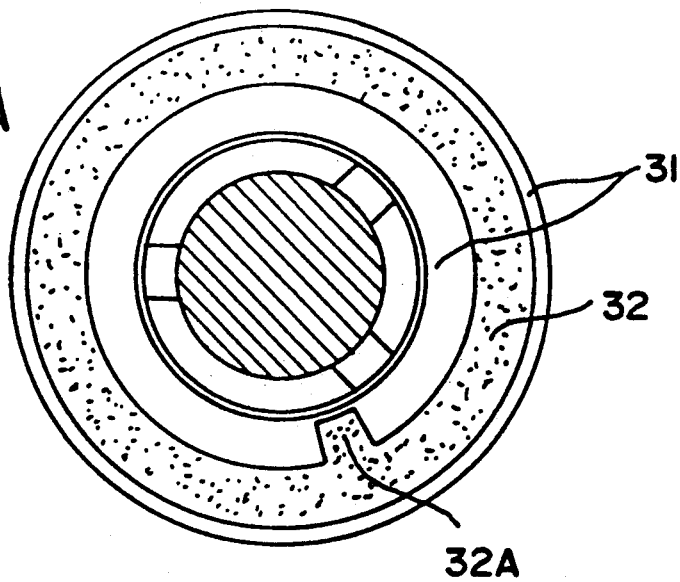

In FIGS. 6A to 6C, the process of manufacturing the collector paths 32 and 33 on the rotating disk 31 is shown. According to FIG. 6A, the radially outermost collector path 32 is first shown as a continuous circular ring on the rotating disk 31 that has an extension 32A that is directed radially inward. According to FIG. 6B, an insulating layer 37 is applied to the rotating disk 31 that partially covers the collector path 32 and separates it slightly from the extension 32A. According to FIG. 6C, the inner collector path 33 is then put on the insulating layer 37 in such a way that the inner collector path 33 is insulated from the outer collector path 32 and the extension 32A is directed radially inward. The inner path 33 has an extension 33A that is also directed radially inward. The two extensions 32A and 33A are in the radial area of the resistance path 22 and serve as connectors of the slide contacts 35 and 36 to the collector paths 32 and 33.

The operation of the potentiometer of the invention corresponds to the operation of conventional potentiometers. In the embodiment according to FIGS. 1 to 3, two redundant measured values are received at the terminal contacts 10 and 11.

In the embodiment according to FIGS. 5 and 6, two measured values are received at the terminal contacts 27 and 28 that produce two sinusoidal lines offset by 90° with respect to each other in accordance with the rotation of the shaft.

I claim:

1. In a potentiometer for measuring the angle of rotation of a shaft relative to a fixed disk having at least one resistance path in the shape of a circular arc mounted thereon, the shaft having at least one collector path in the shape of a circular arc associated therewith, a first slide contact means in contact with the resistance path and a second slide contact means in contact with the collector path for tapping the current therein, the improvement which comprises (a) a disk connected with the shaft for rotation therewith, the rotating disk being arranged in spaced parallel relation relative to the fixed disk and the at least one collector path associated with the shaft comprising two collector paths being mounted on the rotating disk in the shape of concentric circles;

(b) the first slide pair of slide contacts connected with the fixed disk and are in contact with the two collector paths, respectively, of the rotating disk; and (c) a second pair of slide contacts connected with the rotating disk at least one of which is in contact with one of said collector paths for contact with a resistance path of the fixed disk.

2. A potentiometer as defined in claim 1, wherein two resistance paths in the shape of concentric circular arcs are mounted on the fixed disk, one of said resistance paths being in constant contact with said slide contacts connected with said rotating disk.

3. A potentiometer as defined in claim 1, wherein the resistance path mounted on the fixed disk is shaped as a circular ring and further wherein the slide contacts connected with the collector paths and in contact with the resistance path are offset from each other by a given rotational angle.

4. A potentiometer as defined in claim 3, wherein said offset angle is 90°.

* * * * *

UNITED STATES PATENT AND TRADEMARK OFFICE
CERTIFICATE OF CORRECTION

PATENT NO. : 5,113,172

DATED : May 12, 1992

INVENTOR(S) : LANG, Armin

It is certified that error appears in the above-identified patent and that said Letters Patent is hereby corrected as shown below:

Column 3, line 24, after "a" insert: -- rotating --;

Column 4, line 5, after "slide" (first occurrence), insert:
-- contact means comprising a first --;
change "with" to: -- to --;

line 6, change "and are" to: --, said slide contacts are each --;
after "with", insert: -- one of --;

line 7, delete: ", respectively,";

line 8, after "(c)", insert: -- the second slide contact means comprising --;
change "with" to: -- to --;

line 10, change "which" to: -- the second pair of slide contacts --;

Column 4, line 19, after "the", insert: -- second pair of --;
after "contacts", insert: -- are --;

line 20, change "with" to: -- to --;

UNITED STATES PATENT AND TRADEMARK OFFICE
CERTIFICATE OF CORRECTION

PATENT NO. : 5,113,172

DATED : May 12, 1992

INVENTOR(S) : LANG, Armin

It is certified that error appears in the above-identified patent and that said Letters Patent is hereby corrected as shown below:

Column 4, line 21, after "path", insert: -- and --.

Signed and Sealed this

Twelfth Day of October, 1993

Attest:

BRUCE LEHMAN

Attesting Officer

Commissioner of Patents and Trademarks